June 25, 1968  R. S. WEBB  3,390,246
ELECTRICAL DISCHARGE MACHINING POWER SUPPLY CIRCUIT
Filed Dec. 13, 1965  3 Sheets-Sheet 1
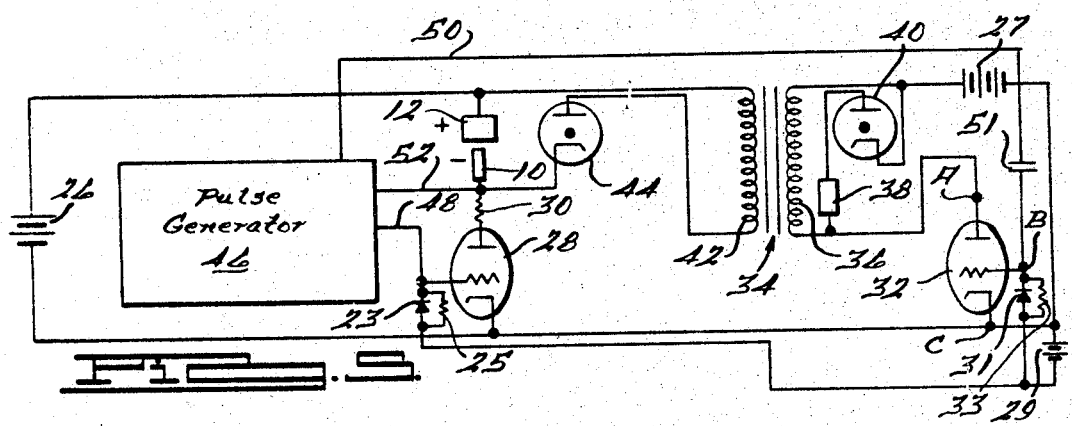
FIG. 2.
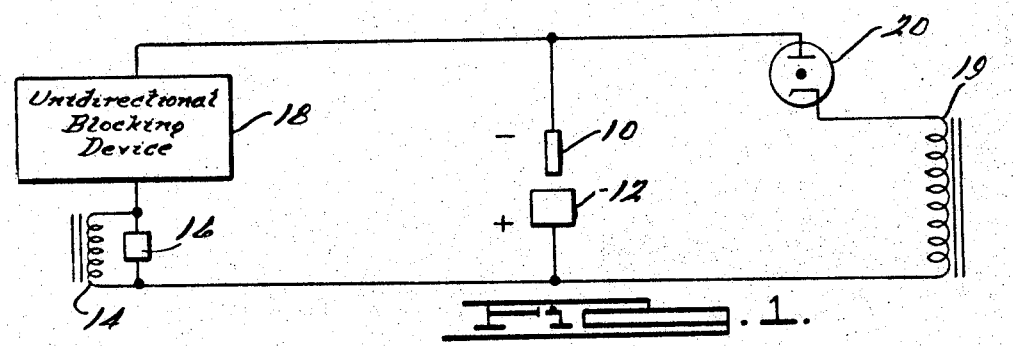
FIG. 1.
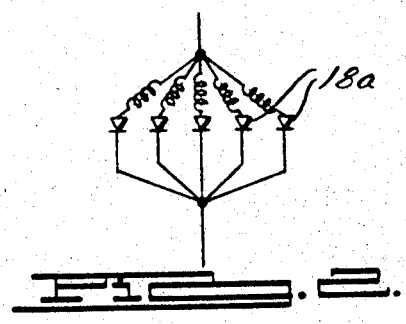
FIG. 4.
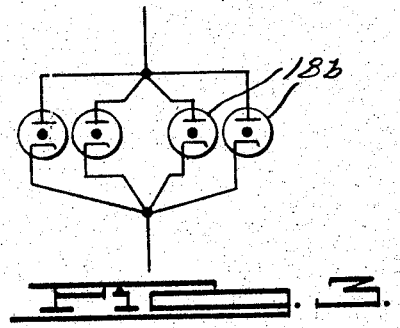
FIG. 3.
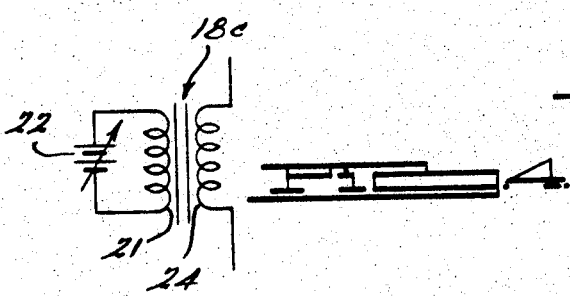
INVENTOR.
Robert S. Webb
BY Harry R. Dumont
ATTORNEY.

June 25, 1968   R. S. WEBB   3,390,246
ELECTRICAL DISCHARGE MACHINING POWER SUPPLY CIRCUIT
Filed Dec. 13, 1965   3 Sheets-Sheet 2

INVENTOR.
Robert S. Webb
BY Harry R Dumont
ATTORNEY.

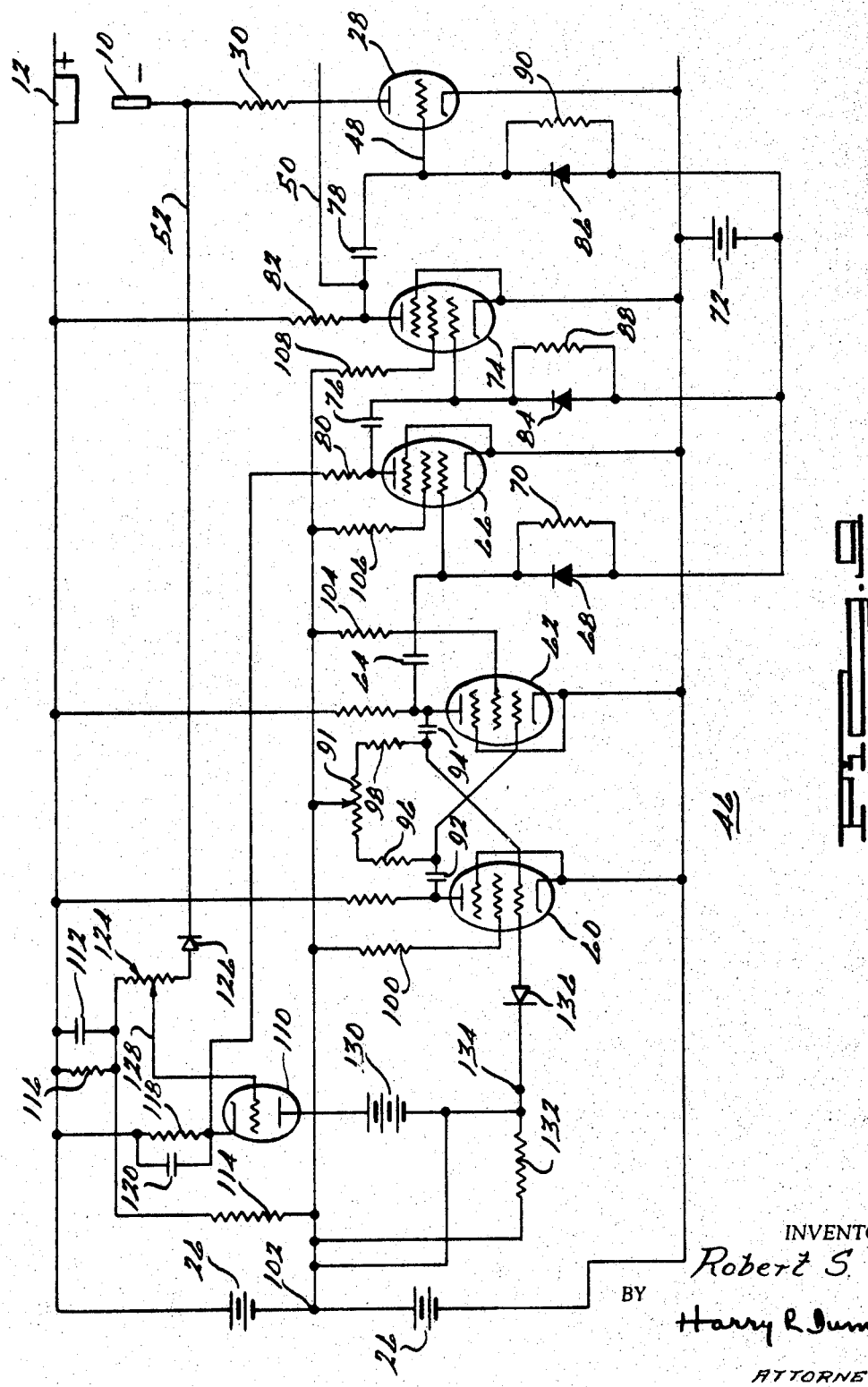

United States Patent Office 3,390,246
Patented June 25, 1968

3,390,246
ELECTRICAL DISCHARGE MACHINING
POWER SUPPLY CIRCUIT
Robert S. Webb, Bloomfield Hills, Mich., assignor, by mesne assignments, to Elox Inc., Troy, Mich., a corporation of Delaware
Continuation-in-part of application Ser. No. 29,363 May 16, 1960, now Patent No. 3,229,159, Jan. 11, 1966. This application Dec. 13, 1965, Ser. No. 513,275
4 Claims. (Cl. 219—69)

ABSTRACT OF THE DISCLOSURE

Method and apparatus for electrical discharge machining wherein a high voltage, high current pulse of relatively short duration is superimposed on the leading edge of a low voltage machining pulse of equal or less current.

The present application is a continuation-in-part of my U.S. application No. 29,363, entitled "Superimposed High Striking Voltage," filed on May 16, 1960, now Patent No. 3,229,159, issued Jan. 11, 1966, and of common ownership herewith.

In electrical discharge machining, electrical machining pulses are passed between an electrode tool and a conductive workpiece through a dielectric coolant filled gap to provide stock removal at a precisely controlled rate and within close tolerance limits. It has been found highly advantageous to utilize electrical discharge machining power supply circuits which superimpose a high striking voltage on the leading edge of each of the machining power pulses passed across the gap between electrode and workpiece. By "striking voltage" is meant that gap peak voltage which is required to exist for a sufficient time just prior to each gap discharge to break down and ionize the dielectric filled gap thereby causing the discharge. The time required for the dielectric breakdown is dependent upon the gap spacing and other factors but is generally of the order of a microsecond. Transient voltages of much higher voltage and of much shorter duration may occur across the gap without causing gap breakdown. By the method of superimposed voltages, it is possible to ionize the gap by the high voltage portion of the pulse while the main machining power is provided by the balance of the relatively high current machining power pulse. In the practice of the superimposed high striking voltage type of electrical discharge machining, the time duration of the superimposed high voltage pulse is normally much shorter than that of the machining power pulse.

In the further development and refinement of superimposed high striking voltage machining power supplies, it has been found that greatly improved metal removal rates result when the superimposed high voltage pulse is one also of relatively high current. The important advantage of this type of electrical discharge machining is that a relatively high peak current flows from the circuitry during the initial period of gap ionization. Sludge and resistive loading of the gap such as by minute stringers are thus disintegrated by this high peak current at a relatively high voltage level. In the sludge loaded gap condition where the gap is of a medium resistance value, the superimposed high voltage pulse valve is of little value unless it is of relatively high current magnitude. The present circuitry is designed to furnish high voltage, high current pulses superimposed on the leading edges of low voltage machining pulses of equal or less current. Otherwire stated, the high voltage spike has a current magnitude at least equal to the peak current of the machining pulse on which it is superimposed.

Accordingly, it is an object of the present invention to provide a power supply circuit for electrical discharge machining which furnishes a series of high voltage, high current, relatively short duration striking pulses superimposed on low voltage, high current machining pulses of relatively long duration.

It is a further object of the present invention to provide a power supply circuit for electrical discharge machining which provides from an alternating current power supply a series of high voltage, high current, relatively short duration striking pulses superimposed on low voltage, high current machining pulses of relatively long duration.

It is an additional object of the present invention to provide a power supply circuit for an electrical discharge device having nonlinear load characteristics which is effective to provide a series of high voltage, high current, relatively short duration striking pulses superimposed on low voltage, high current pulses of relatively long duration.

The unique features and advantages of the present invention and the manner in which the foregoing objects may best be achieved will be more clearly understood by reference to the following detailed descriptions of several representative embodiments of the invention when taken in connection with the accompanying drawings, in which:

FIGURE 1 is a schematic drawing showing an electrical discharge machining power circuit in which the two pulse sources are derived from transformers;

FIGURES 2, 3, and 4 are illustrative of three alternate embodiments of the unidirectional blocking device utilized in the schematic of FIGURE 1;

FIGURE 5 is a combined diagrammatic, schematic drawing showing a relatively high frequency electrical discharge machining power circuit in which the two pulse sources include electronic switches;

FIGURE 9 is a schematic drawing showing a multivibrator and associated circuitry utilized as the pulser in the circuit of FIGURE 5.

Figures 6, 7, 8:
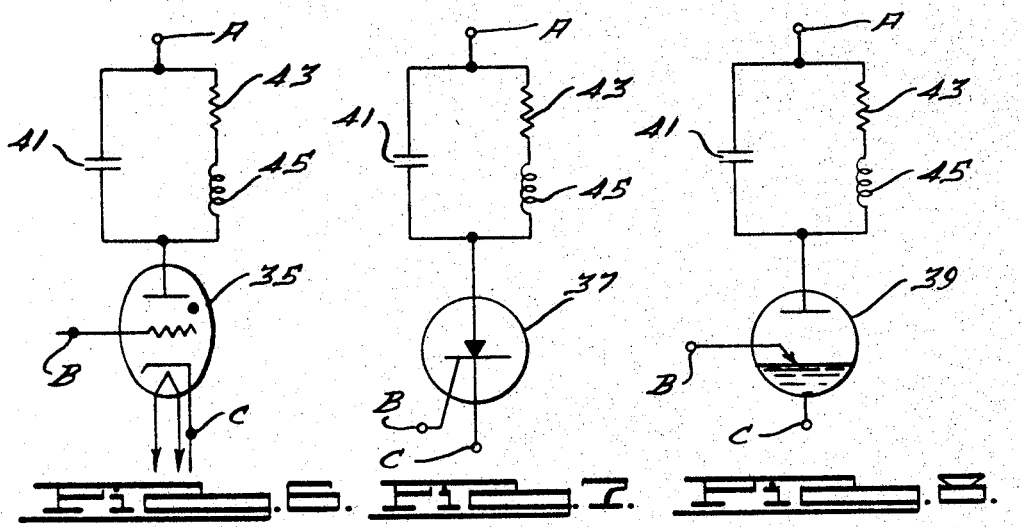
FIGURES 6, 7 and 8 show alternate embodiments of the electronic trigger devices used in the circuit of FIGURE 5 and their connection.

Referring to FIGURE 1, it will be seen that the machining gap, which is normally filled with a dielectric coolant during the electrical discharge process, comprises an electrode 10 of negative polarity and a workpiece 12 of positive polarity. Two pulse sources are utilized to furnish machining power pulses of the requisite voltage and current characteristics as provided by the teaching of this invention. The first source is operative to provide a series of pulses having relatively low voltage, high current characteristics whereby the bulk of the power available for metal removal is furnished. This first source comprises a transformer secondary winding 14 across which a semiconductive device having a non-linear voltage-ampere characteristic, namely, Thyrite cell 16, is connected to protect the winding against the effect of abnormally high voltage surges. A unidirectional blocking device 18 is serially connected with transformer winding 14 across the gap. Unidirectional blocking device 18 must have current characteristics enabling it to pass full rated forward current to the gap, yet must have a voltage characteristic enabling it to block the high superimposed voltage pulse furnished by the second pulse source. In the circuit of FIGURE 1, the second pulse source of pulses having relatively high voltage, high peak current characteristics comprises a transformer secondary winding 19 serially connected with a rectifier, in the present instance, a gas diode 20, across the machining gap. A requirement for successful practice of the present invention is that two sources of machining voltage be present and that the two be operated in unison so that the superimposed voltage spike furnished by the higher voltage source, in the present instance, that source containing secondary winding 19, will be imposed on the leading edge of the lower voltage machining pulse furnished by the other voltage source.

FIGURES 2, 3, and 4 show several alternate embodiments of unidirectional blocking device 18 which fulfill the requirements above stated for that device in connection with FIGURE 1. FIGURE 2 shows a plurality of silicon diodes 18a parallel connected by substantially equal length leads to provide a balanced inductance in the circuit. The gas diodes 18b shown in FIGURE 3 are similarly connected and likewise suitable for use. Gas diodes are currently commercially available to handle forward current ratings of a relatively high order of magnitude. Another embodiment is illustrated in FIGURE 4 in the form of saturable core reactor 18c which includes DC winding 21, variable DC bias source 22 connected thereto, and AC winding 24. It has been found in the practice of the present invention that saturable reactor 18c as prebiased to pass current in the forward direction has reverse characteristics effective to cause reverse blocking. Saturable reactors utilizing either laminated iron or ferrite cores have been found to provide satisfatcory results.

FIGURE 5 shows an alternate and preferred embodiment of the present invention in which the machining power supply is of the pulse generator type and is operable at high frequencies with improved surface finish and higher metal removal rates. The circuit of FIGURE 5 like the circuit of FIGURE 1 provides two machining power sources operable in unison to provide a first source of relatively low voltage, high current machining power pulses and a second source of relatively high voltage, high current pulses superimposed on the leading edge of each of the machining power pulses. The superimposed pulses from the second source are of a current magnitude at least equal to the current magnitude of the machining power pulses but of much shorter time duration. The first source of low voltage, high current pulses in the circuit of FIGURE 5 comprises a DC source 26 and a periodically operable electronic switch 28 which may be a vacuum tube or tube bank serially connected across the machining gap, which gap comprises electrode 10 and workpiece 12. A resistor 30 is connected between the plate of tube 28 and the gap. Grid bias for tube 28 is furni hed by DC source 29 while drive signal is shaped by the network including diode 23 and resistor 25. The source of high voltage, high current pulses employed includes a periodically operable electronic switch embodied as hard pulse modulator tube 32, which tube has its power electrodes operatively connected across a DC source 27. Hard pulse modulator tubes have come into wide acceptance in the electronic art for pulse modulation service. Hard pulse modulator tubes of the oxide-cathode shielded grid type are particularly suitable for electrical discharge machining. Such tubes are currently commercially available from the Machlett Laboratories, Inc. of Springdale, Conn., and from other sources. DC source 27 is of substantially higher voltage magnitude than source 26. DC sources 26 and 27, while shown as batteries for simplification of the circuit, are usually embodied in commercial machines as AC input transformers, with the required rectifiers and filters. Grid bias is furnished for tube 32 by DC source 29 while drive signal is shaped by the network including diode 31 and resistor 33. A pulse transformer 34 is utilized to couple the high voltage source 27 to the machining gap. The primary winding 36 of transformer 34 is connected between the plate of tube 32 and the positive terminal of source 27. Connected serially across the primary winding 36 of pulse transformer 34 are a Thyrite cell 38 and a gas diode 40. Thyrite cells and diodes may be employed separately or together as shown as inverse voltage blocking devices. The secondary winding 42 of pulse transformer 34 is connected across the gap through a gas diode 44. It will be seen that tubes 28 and 32 have their control grids operatively connected to the output of a pulser 46 for rendering them conducting and nonconducting in phase and at high frequencies. The control grid of tube 28 is connected to pulser output lead 48 and the control grid of tube 32 is connected to pulser output lead 50 for this purpose. Capacitor 51 is connected in lead 50 with its magnitude chosen in conjunction with that of resistor 33 to provide a relatively short duration triggering pulse to tube 32 as compared to the triggering pulse furnished to tube 28. An additional cut-off sensing lead 52 is connected between the pulser 46 and the gap for a purpose and with a function which will be explained in connection with FIGURE 9, hereinafter.

FIGURES 6 through 8 show devices of the electronic trigger type suitable for incorporation in the circuit of FIGURE 5 in place of hard pulse modulator tube 32 with correspondingly lettered terminals A, B and C. It will be appreciated that with proper redesign of the circuit any electronic switch may be substituted. By "electronic switch" is meant any electronic control device having three or more electrodes comprising at least two principal or power electrodes acting to control current flow in the power circuit, the conductivity between the principal electrodes being controlled by a control electrode within the switch whereby the conductivity of the power circuit is controlled statically or electrically without movement of mechanical elements within the switch. Included within this definition are vacuum tubes and transistors in which turn-on is accomplished by a control voltage applied to the control electrode and in which turn-off is accomplished automatically in response to the removal of that control voltage. Also included in the definition are devices of the gate type in which turn-on is accomplished by a control voltage applied to the control electrode which control voltage may be then removed and in which turn-off is accomplished by application of a subsequent control voltage to the control electrode. An additional class of electronic switches called electronic trigger devices falls within this definition and includes ignitrons, thyratrons, and semiconductor controlled rectifiers. By "electronic trigger device" I mean any electronic switch of the type which is triggered on at its control electrode by a pulse and is turned off by reverse voltage applied for a sufficient time across its principal electrodes. The thyratron 35 of FIGURE 6, the silicon controlled rectifier 37 of FIGURE 7 and the ignitron 39 of FIGURE 8 are all examples of electronic trigger devices. A parallel LRC network including capacitor 41, resistor 43 and inductor 45 is connected to the anode of the respective electronic trigger devices to provide the required turn-off. Additional circuit parameter changes may be required to incorporate the devices of FIGURES 6, 7 and 8 in place of hard pulse modulator tube 32 in the circuit of FIGURE 5 but these will be apparent to one skilled in the electronic art. The mode of operation of the circuit of FIGURE 5 employing these devices as switching means will be explained in connection with FIGURES 10 and 11, hereinafter.

FIGURE 9 shows one type of pulse generator 46 particularly suitable for utilization in the present invention which includes a multivibrator, amplifier stages, and an associated per pulse cut-off circuit. It will be recognized that tubes 28, 32 as shown in FIGURE 5 may represent, respectively, banks of tubes connected in parallel with a number of tubes sufficient to meet the power requirements of the particular electrical discharge machining application. The workpiece 12 is connected to the positive terminal of the power source 26. Power source 26 preferably provides a center tap 102 for furnishing screen voltages as shown. Tube 28 has its cathode connected to the negative terminal of voltage 26 and is connected in the electrical discharge machining power supply circuit in the manner previously shown in FIGURE 5. The following description will be made with particular reference to the operation of tube 28 but it will be seen that the pulser output is furnished to tube 32 as well so that control of the two tubes is exercised in unison.

In precision machining by EDM, it is imperative that the power tubes be pulsed ON and OFF at precise, sharply defined intervals. The voltage waveform between grid and cathode of tube 28 is turned ON and OFF sharply to provide optimum gap discharge. This rectangular drive pulse to the grid of tube 28 through lead 48 is generated by the multivibrator stage of pulse generator 46 comprising multivibrator tubes 60 and 62 operating according to well known principles of vacuum tube multivibrator design. It may be seen that in the FIGURE 9 circuit, when multivibrator tube 60 is ON, tubes 28 and 32 and the gap are ON, and power is supplied to the machining gap. Tubes 28, 32 and the gap power are OFF when multivibrator tube 60 is OFF.

The rectangular pulsating output of multivibrator tube 62 is connected through coupling capacitor 64 to the control grid of a buffer tube 66. The pulsating signal is clamped to bias 72 through diode 68 and drive or turn ON signal for tube 66 is developed across resistor 70. The rectangular voltage drive tends to be in excess of bias 72 and the excess portion is clipped by the grid of pentode 66 in a manner well known in the electronics art as re-squaring of the pulse such that the output of the tube 66 has an even sharper voltage rise and fall than the output of the multivibrator. In a similar manner, a tube bank represented by pentode 74, amplifies the output from pentode 66 and the signal is again re-squared at the grid of this tube as well as at the grid of the power tube 28 itself. Coupling capacitors 76 and 78 deliver signal from plate load resistors 80 and 82 to the grids of tubes 74 and 28, respectively. Diodes 84 and 86 and drive resistors 88 and 90 shape the drive signal of the respective tubes. The output tubes 28 and 32, as has been pointed out, may consist of a number of parallel connected tubes. The grid circuit of tube 28 and, similarly, of tube 32 are therefore supplied with rectangular pulsating power in the order of magnitude required, depending on the number of tubes parallel-connected in the bank.

A multivibrator grid return and rheostat 91 are so provided that by adjusting rheostat 91 an increase in resistance in one grid circuit automatically decreases resistance in the other grid circuit. An analysis of the respective ON and OFF time of each of the multivibrator tubes 60 and 62 and the formula for determining this, shows how to achieve a fixed output frequency. In other words, for equal value capacitors 92 and 94, connected in the grid circuits as shown, the time duration of one complete cycle of operation may be represented by:

$$t = KC(R91 - R96 - R98)$$

in which the discharge time constant is in units of microseconds when resistance is expressed in units of ohms and capacitance is expressed in units of microfarads. The letter K indicates a constant which is the constant for the circuit dependent upon the circuit parameters such as plate voltage gain and the like. This feature is particularly important in an EDM circuit, since a constant frequency of operation may be maintained and the gap ON time may be varied directly with the ON time of multivibrator tube 60 as determined by capacitor 92, resistor 96 and the portion of the rheostat 91 included in the grid return circuit of multivibrator tube 62. Turning the rheostat arm to the right, thus increasing the resistance in the grid circuit of tube 62 will cause an increase in the ON time of tube 60 and corresponding increase in ON time of the gap. Since the effect of output tube 28 during ON time may be approximated by a resistance, the quantity of machining current passed through the gap may be controlled by the respective ON time of multivibrator tube 60 and therefore tube 28, thus giving precise control of the machining current supplied to the gap and permitting an infinite number of adjustments of that machining current while maintaining a fixed machining frequency. The screen grid of pentode 60 is connected through limiting resistor 100 to screen voltage center tap 102. Similarly, the screen grid of pentode 62 is connected through resistor 104, the screen grid of pentode 66 is connected through resistor 106, and the screen grid of pentode 74 through resistor 108, each to screen voltage tap 102.

A per-pulse cut-off circuit is included in pulse generator 46 which comprises a cut-off tube 110 and associated circuitry. When power tube 28 is pulsed ON, the cut-off circuitry is such that it is capable of supplying power to the machining gap. Prior to the machining pulse, multivibrator tube 60, buffer tube 66, and power tube bank 28 are all cut-off or nonconducting. Per pulse cut-off tube 110 is rendered nonconductive by the DC bias stored across capacitor 112 developed by voltage dividing resistors 114 and 116. With cut-off tube 110 nonconductive, operation of the multivibrator is unimpaired and as multivibrator tube 60 turns ON, correspondingly, buffer tube 66 is rendered conductive. Included in the plate circuit of tube 66 are limiting resistor 80 and keying resistor 118 which resistor is connected in the cathode circuit of cut-off tube 110. Delay capacitor 120 is shunted across resistor 118 so that the signal from buffer tube 66 is delayed briefly from arriving in the cathode circuit of tube 110.

The time constant of this delay network is very brief, generally in the order of a few microseconds or less, and is intended to permit passage of drive signal to tubes 28 and 32. Assuming a condition of open circuit, an increasing open circuit voltage is generated across the working gap and is detected by sensing lead 52 and presented to reference potentiometer 124 through diode 126. The portion of this signal determined by the setting of potentiometer arm 128 is presented to the grid of cut-off tube 110. This signal corresponding to gap voltage renders the grid of tube 110 more negative. After the delay interval achieved through use of capacitor 120, signal is developed across resistor 118 in the cathode lead of cut-off tube 110. This signal is of a polarity tending to render tube 110 conductive. However, the presence of a portion of the gap voltage at arm 128 cancels this keying signal and thus the cut-off tube 110 remains nonconductive and operation of the circuit is unimpaired and proceeds in accordance with the normal functions of multivibrator tubes 60 and 62.

If the working gap is shorted, or is of such a low voltage that the signal developed at potentiometer arm 128 is insufficient to overcome the keying signal developed across resistor 118, cut-off tube 110 becomes instantaneously conductive. Conduction of the cut-off tube causes electron flow from the negative terminal of floating DC supply voltage 130 through resistor 132 to screen voltage tap 102 of the main DC power supply 26. The voltage generated across resistor 132 is substantially in excess of that of screen voltage tap 102 thus causing reference point 134 to become negative with respect to the cathode of tube 60. Reference point 134 is rendered sufficiently negative to interrupt conduction of multivibrator tube 60 and trigger the OFF portion of the cycle. During the period of conduction, tube 60 was ON and in-phase with power tubes 28 and 32.

Thus, as cut-off tube 110 renders tube 60 nonconductive, the amplifier instantaneously renders power tubes 28 and 32 nonconductive thus interrupting the condition of short circuit or low voltage conduction in the gap. This interruption lasts for the normal duration of OFF time or dwell between pulses as determined by multivibrator grid circuit 94, 98, 91 of tube 60. In this manner, the occurrence of a short circuit in the machining gap causes instantaneous interruption of the particular machining pulse. During normal operation of this circuit, the grid of multivibrator tube 60 is isolated from the cut-off circuitry by diode 136. Diode 136 becomes conductive only during periods of operation of cut-off tube 110, at which times terminal 134 is more negative than either the cathode or grid of tube 60.

Description of operation

Figure 10:
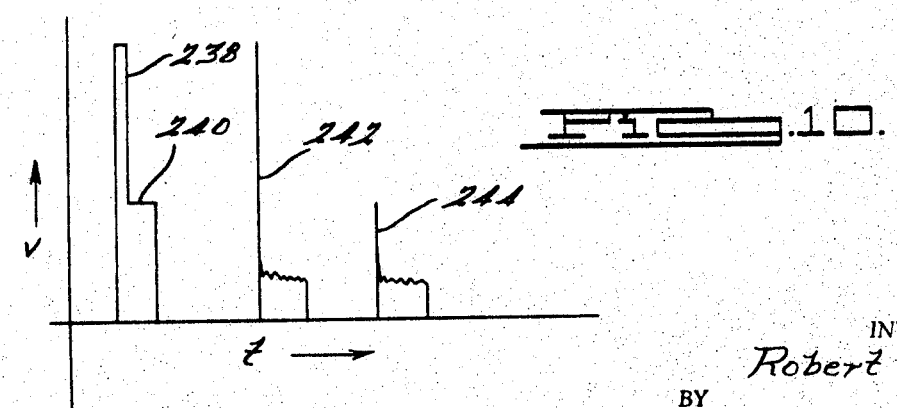

The operation of the preferred embodiment of the present invention as exemplified by the circuit of FIG. 5 will now be considered with particular reference to the gap voltage waveform of FIG. 10. On gap open circuit, the superimposed high voltage spike 238 provided by the turn ON of tube 32 is substantially higher in magnitude than the low voltage pulse 240 provided by the turn ON of tube 28. The high voltage portion of the machining pulse is additionally of high current. It should be noted that the fall of the superimposed portion 238 occurs very sharply due to turn OFF of the hard pulse modulator tube. The following pulses 242 and 244 are shown as breaking down at progressively lower voltages. The particular advantage of the high current, high voltage superimposed circuitry is that the high voltage pulse delivered by operation of tube 32 has a relatively high current which serves to disintegrate any particles of previously machined material in the gap during the initial or gap ionization period. The main machining power is delivered by the lower voltage portion of the pulse as shown by numeral 240.

Figure 11:
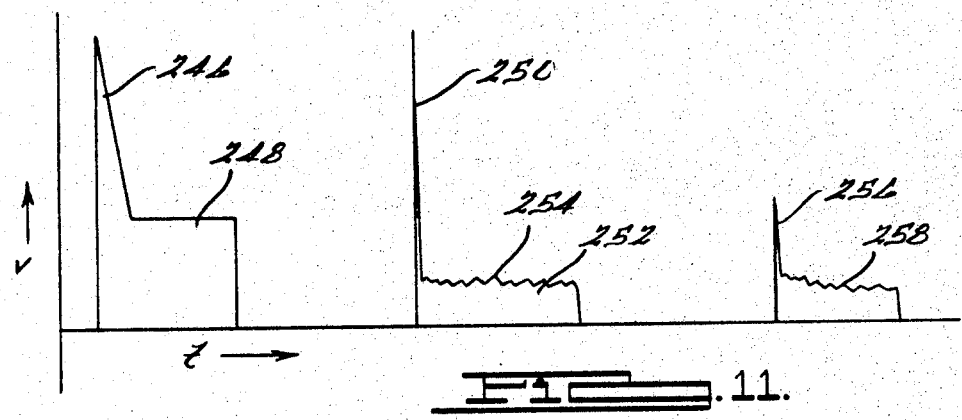
FIGURES 10 and 11 are voltage waveforms illustrating the mode of operation.

FIGURE 11 shows the gap voltage waveform such as would be provided by the circuit of FIG. 5 in which a substitution of an electronic triggering device such as those shown in FIGS. 6–8 is made for hard pulse modulator tube 32. FIGURE 11 again shows the superimposed high voltage spike 246 substantially higher in magnitude than the low voltage pulse 248 occurring on open circuit conditions. The second voltage pulse comprising high voltage portion 250 and low voltage portion 252 is arbitrarily shown as being equal in magnitude to the first pulse and breaking down instantaneously due to gap ionization with arc conduction occurring as indicated at line 254. The third pulse is shown as firing the gap at a somewhat lower voltage 256 with conduction occurring at line 258. In each case, the higher voltage superimposed pulse is also of high current and of shorter duration than the low voltage pulse.

It should be noted that while the present inventive circuit has been described with respect to its incorporation in an electrical discharge machining power supply circuit, it has similar utility as a pulse generator circuit for any load device of the electrical discharge type having non-linear load characteristics.

In the exemplary embodiments of the present invention, the electrode tool is shown as connected to the negative output of the machining power supply and the workpiece to the positive output. Present day experience indicates that in certain specialized and improved forms of electrical discharge machining that polarity may be reversed. It is, however, preferable in either case that discrete pulses of the same polarity be applied and that polarity should be selected in accordance with known principles. The circuitry of the present invention will operate equally well with either polarity selected.

From the foregoing specification, it will be seen that I have shown and described a novel and improved process and apparatus for electrical discharge machining.

I claim:

1. In an electrical discharge machining apparatus for machining a conductive workpiece by intermittent electrical discharge between a tool electrode and the workpiece across a dielectric coolant filled gap, a first source of machining power, a first electronic switch having a control electrode and having its principal electrodes connected between said first source and said gap to provide relatively low voltage, low current pulses thereto, a second power source, an electronic triggering device having a control electrode and having its principal electrodes connected between said second source and said gap to provide shorter duration pulses of relatively higher voltage and of at least equal peak current thereto, and a pulser having its output connected to the control electrode of said switch and the control electrode of said electronic triggering device for rendering them conductive in unison.

2. In an electrical discharge machining apparatus for machining a conductive workpiece by intermittent electrical discharge between a tool electrode and the workpiece across a dielectric coolant filled gap, a first source of machining power, a first electronic switch having a control electrode and having its principal electrodes connected between said first source and said gap to provide relatively low voltage, low current pulses thereto, a second power source, an electronic triggering device having a control electrode and having its principal electrodes connected between said second source and said gap to provide shorter duration pulses of relatively higher voltage and of at least equal peak current thereto, a pulser having its output connected to the control electrode of said switch and the control electrode of said electronic triggering device for rendering them conductive in unison and a turn-off network connected to one of said principal electrodes of said electronic triggering device, said network comprising a series connected inductor and capacitor and a shunt discharge path for said capacitor.

3. In an electrical discharge machining apparatus for machining a conductive workpiece by intermittent electrical discharge between a tool electrode and the workpiece across a dielectric coolant filled gap, a relatively low voltage, low current source of machining power and a first electronic switch operatively connected to said gap, a second power source and a second electronic switch operatively connected to said gap for providing a higher voltage, higher peak current shorter duration pulse output thereto, and a pulser having its output connected to to the control electrode of each of said switches for rendering them conducting in unison.

4. A pulse generator for a nonlinear load device comprising, a first power source and a first electronic switch operatively connected to said device to provide relatively low voltage, low current pulses thereacross, a second power source and a second electronic switch operatively connected to the device to provide shorter duration pulses of relatively higher voltage and at least equal peak current thereacross, and a pulser having its output connected to the control electrode of each of said switches for rendering them conducting in unison.

References Cited

UNITED STATES PATENTS

| | | | |
|---|---|---|---|
| 2,979,639 | 4/1961 | Williams et al. | |
| 3,020,448 | 2/1962 | Fefer | 219—69 X |
| 3,052,817 | 9/1962 | Branker | 219—69 X |

RICHARD M. WOOD, *Primary Examiner.*

R. F. STAUBLY, *Assistant Examiner.*